July 30, 1968  R. A. SHERMAN  3,394,730
HOSE REELING DEVICE
Filed June 22, 1965  2 Sheets-Sheet 1
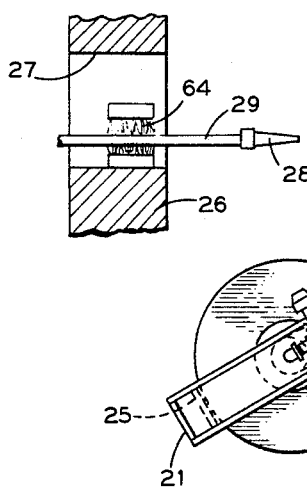
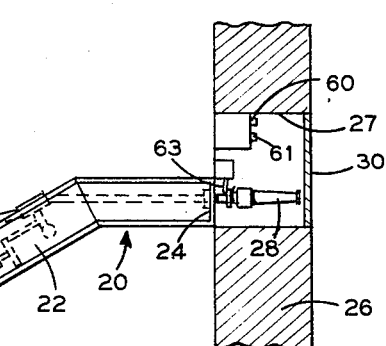
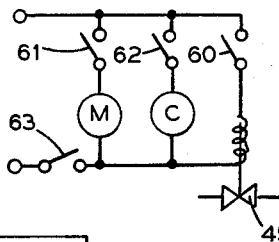
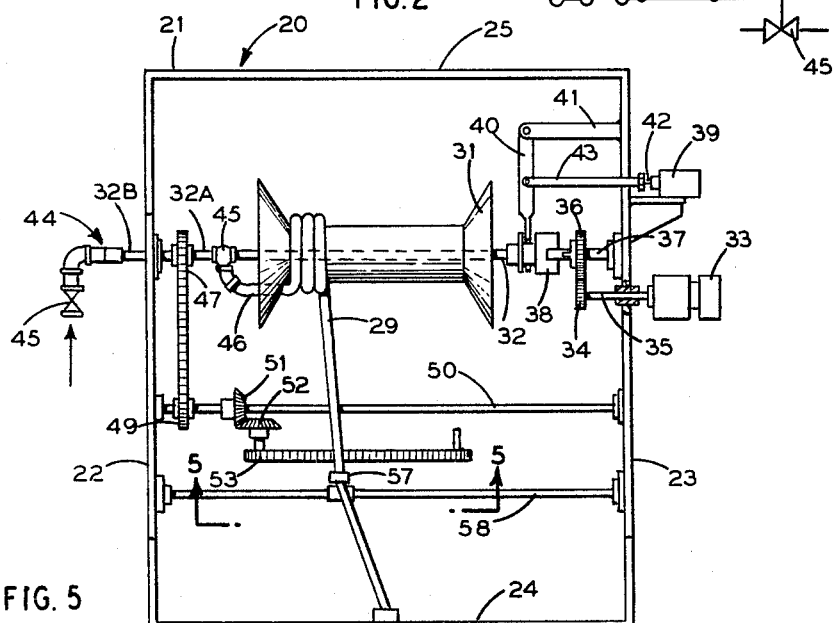
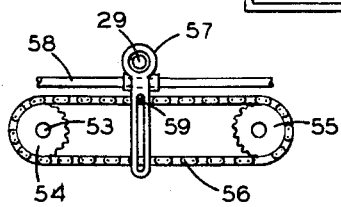
INVENTOR.
Robert A. Sherman
BY
Irving Seidman
ATTORNEY

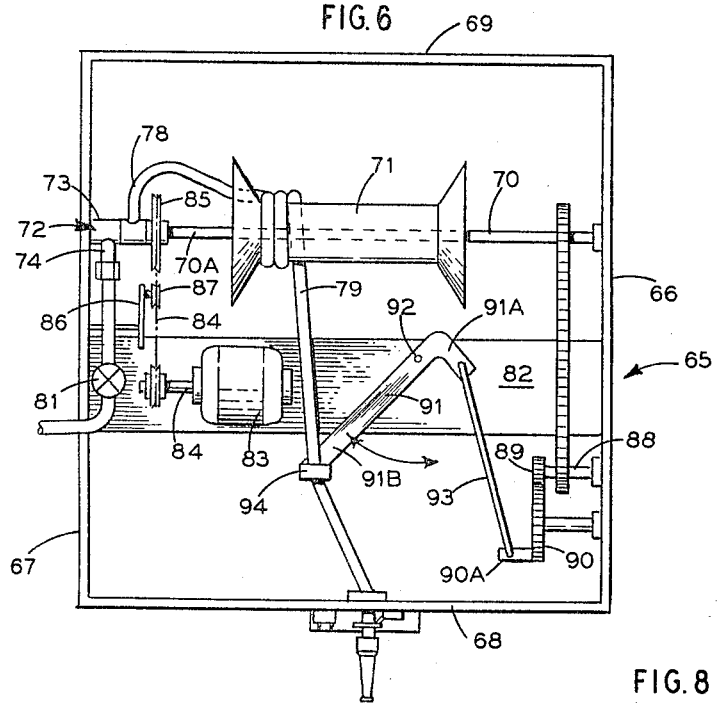
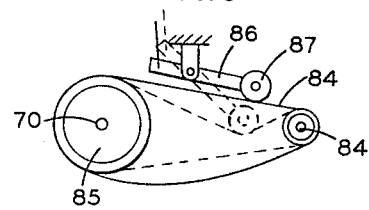
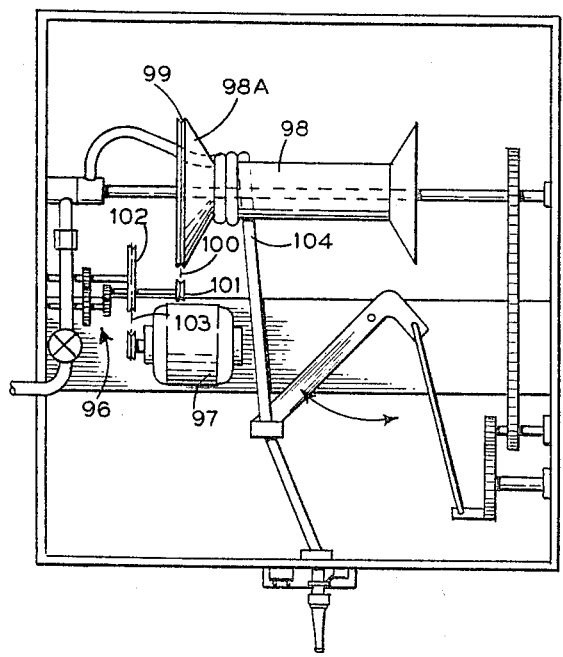
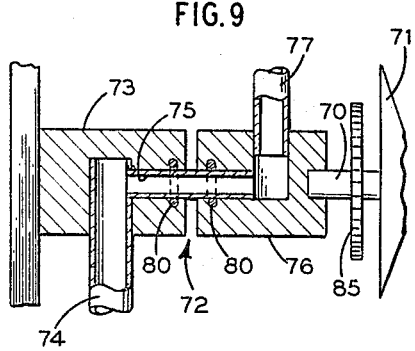

United States Patent Office 3,394,730
Patented July 30, 1968

3,394,730
HOSE REELING DEVICE
Robert A. Sherman, 4 N. School Lane,
Lancaster, Pa. 17603
Filed June 22, 1965, Ser. No. 466,037
9 Claims. (Cl. 137—355.22)

ABSTRACT OF THE DISCLOSURE

This invention is directed to a hose reeling device in which a reel is connected to a drive shaft journalled in a bearing which includes a rotary joint having a water inlet and a water outlet, the later being connected to the hose adapted to be wound and unwound upon the reel. A drive is operatively connected to the reel to affect the drive thereof and a unidirectional clutch is disposed between the drive and the reel to connect the reel in and out of driving relationship whereby the hose may be manually unwound and automatically wound about the reel. The combination also includes a hose guide for guiding the convolutions of the hose in an orderly manner about the reel during a reeling operation. A gear reduction unit is interposed between the drive means and the reel means so that the reeling in of the hose can be accomplished at a very slow rate so as to enable a sprinkling operation and the reeling in of the hose to be simultaneously effected so that at the end of a sprinkling operation the hose is completely stowed in its wound position upon the reel.

This invention relates in general to a hose reeling device, and more specifically to a hose reeling device which is particularly adapted for automatically reeling in a length of hose in a manner in which the convolutions of the hose are orderly arranged on the spool or reel. More specifically the invention is particularly applicable to a hose reel for automatically reeling in a garden hose after its use has ended.

Heretofore, storage of a hose after use was had by manually rolling or reeling the hose onto a spool. While relatively short lengths of such hoses can be conveniently handled, extreme difficulty is oftentimes encountered when long lengths of hose are required to be reeled and handled.

It is therefore an object of this invention to provide an automatic hose reeling apparatus which will automatically reel in the hose regardless of its length in an orderly manner upon completion of its use.

Another object of this invention is to provide the hose reeling apparatus in which the convolutions of the hose are uniformly laid in a neat and orderly manner upon a spool or reel.

Another object of this invention is to provide a hose reeling apparatus which will automatically reel in the hose at a very slow rate so that a sprinkler connected to the end of the hose can be moved over a lawn area to perform a lawn sprinkling operation as the hose is being reeled in so that at the end of a sprinkling operation the hose has been completely reeled in and completely put away in its stowed position.

It is another object of this invention to provide a hose reeling apparatus which is relatively simple in construction, can be easily fabricated, and which is positive in operation.

In accordance with this invention the foregoing objects, features, and other advantages are attained by a hose reeling apparatus which comprises a frame on which there is rotatably journalled a hose reeling means. The hose reeling means comprises a main drive shaft having a reel or spool connected thereto. One end of the shaft is journalled on a bearing which comprises a rotary joint having a water inlet to form the means by which water is supplied to the hose that is adapted to be reeled onto the spool or reel. Accordingly, the rotary joint is provided with a water outlet to which the inlet of the hose is connected. A drive means is connected into driving relationship to the reel means so as to affect rotation thereof during a reeling in operation. A unidirectional clutch means is operatively disposed between the drive means and the reel means so as to connect the reel means into and out of driving relationship with the drive means. The arrangement is such that the hose may be manually unreeled from the spool or reel and automatically reeled in whenever the clutch means is actuated to connect the reel means into driving relationship with the drive means.

A hose guide means is provided for guiding the convolutions of the hose in an orderly manner onto the reel during a reeling in operation. In one form of the invention, the guide means comprises a driven shaft connected into driving relationship with the main drive shaft. Connected on the driven shaft is a drive gear which meshes with a complementary gear that drives an indexing means across the width of the reel or spool for guiding the hose convolutions thereon.

Accordingly, the indexing means of the guide means is synchronized to the rotation of the reel or spool so that the hose convolutions are uniformly laid across the reel.

In another form of the invention the guide means comprises a driven shaft which is connected into driving relationship wtih the main drive shaft. Operatively connected to the driven shaft is a gear which meshes into a complementary gear which has connected eccentrically thereof a crank arm. The crank arm in turn is connected through a connecting rod to a bell crank lever which pivoted to the frame functions as the indexing means. The free end of the bell crank has connected thereto the hose loop through which the hose is threaded. Accordingly in this form of the invention the arrangement is such that the actuation of the drive means effects a transverse movement of the hose loop to control the laying of the convolutions upon the reel or spool.

In another form of the invention a gear reduction unit is interposed between the drive means and the reel means so that the reeling in of the hose can be accomplished at a very slow rate. In this form of the invention the arrangement is such that a sprinkling operation and the reeling in of the hose may be simultaneously effected so that at the end of the sprinkling operation the hose is completely stowed onto its reel.

Means are provided for effecting control of the water through the apparatus. Also a means is provided for automatically deactivating or de-energizing the drive means upon completion of the reeling in operation.

A feature of this invention therefore resides in a relatively simple, compact, self-contained, reeling in apparatus in which a rotary joint permitting the passing of water thereto forms a bearing support for one of the shaft.

Another feature of this invention resides in the relatively simple mechanical arrangement in which the hose guide means is connected in synchronous driving relationship with the main drive of the hose reeling apparatus.

Another feature of this invention resides in the provision of a reduction gear unit interposed between the drive means and the reel means to effect the reeling in of the hose at a very slow rate so that a sprinkling and reeling in operation may be simultaneously performed in a manner such that upon termination of the sprinkling operation and the reeling in of the hose is completed simultaneously.

Other features and advantages will become more readily apparent when considered in view of the drawings and specification in which:

FIGURE 1 is a vertical side view of the hose reeling device of the instant invention.

FIGURE 2 is a plan view of the hose reeling apparatus of FIG. 1.

FIGURE 3 is a fragmentary, detailed view of a modified portion of the hose reeling apparatus.

FIGURE 4 illustrates a schematic diagram showing the circuitry by which the component parts of the hose reeling apparatus are actuated.

FIGURE 5 is a detail view taken along line 5—5 of FIG. 2.

FIGURE 6 is a plan view of a modified form of the apparatus.

FIGURE 7 is a plan view of still another modified form of the apparatus.

FIGURE 8 is a fragmentary side elevation view of the clutch arrangement utilized in the embodiments of FIGS. 5 and 6.

FIGURE 9 is a detail sectional view illustrating the rotary joint bearing utilized in the embodiments of FIGS. 5 and 6.

Referring to the drawings, there is shown in FIGS. 1 and 2, a hose reeling apparatus 20 of this invention. It comprises a frame 21 formed of a suitable structural members. As shown the frame 21 is defined by a pair of side structural members 22, 23 interconnected by front and rear structural members 24, 25 to define a substantially rectangular shape. As seen in FIG. 1 the rear portion of the frame may be inclined at an angle downwardly from the front portion of the frame. Accordingly, the front cross member 24 of the frame 21 may be suitably supported to the internal surface of wall of a suitable building 26 in which the reeling apparatus is to be housed, as for example a basement or cellar of a home, garage, or the like. The wall 26 on which the frame is supported is provided with an opening 27 through which the nozzle end 28 of the hose 29 is extended. A suitable closure 30 may close the hose opening 27.

A reel means comprising of a spool 31 and drive shaft 32 is rotatably journalled on the frame 21. As best seen in FIG. 2 a drive means is provided for effecting the operation of the reel means. In the illustrated embodiment the drive means comprises a motor 33 which has a drive pinion or gear 34 connected to the motor spindle or armature 35. The gear or pinion 34 in turn is connected into meshing relationship with a complementary gear 36 journalled to the drive portion 37 of the main shaft 32. Interconnecting the reel shaft 32 into driving relationship with the drive portion 37 and the motor means 33 is an unidirectional clutch 38 which is adapted to be moved into and out of driving engagement by means of an electrically operated solenoid 39.

The clutch means comprises a slidable clutch member 38 which is moved into engaging and disengaging position by means of a bifurcated lever 40 which is fulcrumed to a support bracket 41. The armature 42 of the solenoid in turn is connected by a link 43 to the bifurcated lever 40, the arrangement being such that whenever the solenoid is actuated, the lever 40 in pivoting moves the slidable clutch member 38 into engagement with the drive portion 37 of the shaft. Accordingly, the reel 31 and shaft 32 are rotated whenever the clutch is engaged in driving relationship with motor means.

In accordance with this invention the other end 32A of the reel shaft 32 is journalled to the opposite side member 22 of the frame. This end of shaft 32A is formed as a conduit through which water is permitted to flow. As shown the free end 32B of the conduit portion 32A of the shaft 32 is adapted to connect up to a rotary seal or joint 44, to be hereinafter described, which is provided with a water inlet through which water is supplied to the hose 29. An electrically operated solenoid valve 45 is connected to the inlet of the rotary joint 44, to control the flow fluid therethrough.

Connected to the outlet of the conduit end 32A of the shaft 32 is a T connector 45, one end of which connects to the inlet end 46 of the hose. Accordingly, whenever the solenoid operated valve 45 is actuated to open the inlet to the rotary joint 44, water is permitted to flow through the conduit end 32A of the shaft 32 and into the inlet of the hose.

Mounted on the main shaft 32 is a pulley or sprocket 47 which is connected into driving relationship by means of a flexible drive belt or chain 48 to a complementary sprocket 49 journalled to a driven shaft 50, the latter being journalled between the opposed side members of the frame 21. The driven shaft 50 has connected thereto a bevel gear 51 which in turn is disposed into meshing relationship with a complementary gear 52 which is suitably journalled on the frame. Connected to the shaft 53 of the complementary bevel gear 52 is a drive sprocket 54; spaced from the drive sprocket 54 on the frame is a driven sprocket 55, the latter being connected into driving relationship with the drive sprocket 54 by means of an endless chain or belt 56 to define the indexing means by which the hose convolutions are laid in an orderly manner about the spool. A hose guide 57 is connected to the one flight of the chain 56 by a pin 59. Accordingly, the hose guide reciprocates in back and forth motion as the chain 56 travels around the sprockets 54, 55. A slide bar 58 is extended between the side members of the frame 21 to form a guide for the hose loop 34 as it reciprocates back and forth as will be hereinafter more fully described. The nozzle end 28 of the hose is threaded through the hose loop 57 is extended outwardly through the opening 27 formed in the wall.

In operation, the hose 29 is manually pulled or unreeled from the spool 31 as the unidirectional clutch is normally disengaged to render the reel free wheeling. Since the flow of water to the hose is controlled by a solenoid actuated valve 45, the actuation of the valve may be remotely performed. Accordingly, a switch 60 connected in a suitable circuit to the valve solenoid may be located adjacent the opening 27 in the building structure. In this manner an operator starts the flow of water through the hose by actuating the switch 60 as the hose is unreeled by manually pulling the same off the reel. Upon completion of a watering operation the operator merely has to close the motor switch 61 which is connected in circuit with the drive motor to start the operation of the motor. Another switch 62 connected to the solenoid actuated clutch is closed to throw the clutch into driving relationship with energized motor. With the clutch engaged, the motor effects the drive of the reel means which in turn causes the hose guide 57 to be transversed back and forth across the width of the spool, and accordingly lay the convolution of the hose 29 in an orderly manner upon the spool 31.

In accordance with this invention, it is to be noted that because the hose guide 57 is connected to an endless chain, the displacement of the hose guide connection 59 from the upper flight to the lower flight as it turns over the sprockets 54, 55 at the ends of the chain effects the delay action necessary to position the hose convolution at the ends of the spool onto the next preceeding convolution to start the next succeeding layer of hose convolutions. In accordance with this invention, a limit switch 63 for deactivating the motor is located so that it may be automatically actuated by the nozzle or end 28 of the hose as the nozzle reaches its position of rest within the opening in the building wall. Thus with the motor automatically de-energized the reeling operation ceases.

If desired, means may be provided for cleaning the hose as it is being reeled. As best seen in FIG. 3, a brush 64 may be disposed in the opening 27 in the building wall structure 26 through which the hose 29 is pulled. Accordingly, the arrangement is such that the hose is required to pass through the bristles of the brush, and doing so is cleaned of any particles of grass or dirt adhering thereto.

FIGURE 6 illustrates a modified form of the invention. In this form of the invention the hose reeling apparatus 65 comprises of a structural frame consisting of a pair of opposed side members 66, 67 interconnected by front and rear cross members 68, 69 to define a substantially rectangular frame. A reel means comprising of a main drive shaft 70 and a spool or reel 71 journalled thereto is rotatably supported between the side frame members 66, 67. One end 70A of the main shaft 70 is rotatably journalled in a rotary joint 72 through which fluid or water is permitted to pass. As best seen in FIG. 8 the rotary joint 72 comprises a bearing member 73 which is fixed to the side 67 of the frame, the fixed bearing member 73 being provided with a water inlet 74. An axially extending nipple 75 is connected to the fixed member 73 in communication with the water inlet 74 thereto. A rotary bearing member 75 is journalled on the free end of the nipple 75, the rotary member 76 being provided with a water outlet 77 which is connected into communication with the inlet 78 of hose 79. Suitable seal means, as for example O-rings 80 are positioned to provide a fluid type seal for the respective members 73, 76 of the rotary joint 72. A solenoid actuated valve 81 is connected to the inlet 74 of the rotary joint to control the flow of fluid therethrough as hereinbefore described.

Secured between the sides 66, 67 of the frame is a platform 82 on which a motor 83 is mounted. The armature 84 of the motor in turn is connected by a belt drive 84 into driving relationship with a pulley 85 journalled on the main drive shaft 70. The driving belt 84 is loosely mounted so that in motor idling position, the belt 84 is free to slip.

In accordance with this invention a means is provided whereby tension may be placed on the drive belt 84 so as to place the main shaft 70 into driving relationship with the motor means 83. As best seen in FIG. 7 the means for applying tension to the drive belt comprises of a lever 86 which has mounted on one end thereof a roller 87 which is adapted to be moved into and out of engagement with the drive belt 84. Whenever the roller 87 is moved into driving relationship with the drive belt 84, tension is placed on the belt 84 which then prohibits slipage to occur thereby connecting the motor means 83 into driving relationship with the main drive shaft 70. The main drive shaft 70 in turn is connected in driving relationship to a driven shaft 88 which is journalled on the frame. Connected to the driven shaft 88 is a gear 89 which is disposed into meshing relationship with a complementary gear 90, the latter having extending laterally thereof a crank arm 90A.

A bell crank 91 is pivotally mounted on the platform 82 of the frame about a pivot 92. Accordingly, one leg 91A of the bell crank 91 is connected to the crank arm 90A by means of a connecting linkage 93. The ends of the connecting linkage 93 are swivelly connected by suitable swivel means to the crank arm 90A and to the bell crank 91.

Conected to the other leg 91B of the bell crank 91 is a hose loop 94 through which the nozzle end of the hose is threaded. In operation whenever the clutch means 86 is engaged to place a tension on the drive belt 84, the reel 71 is thrown into driving engagement with the motor. The drive shaft 70 in turn drives the hose guide means 94 so that the latter traverses laterally across the width of the spool or reel to thereby lay the convolution of the hose in an orderly manner upon the reel 71 during a reeling operation.

It will be noted that the tension means or clutch means 86 for placing the tension on the drive belt 84 may be effected either manually or by actuation of a solenoid which is operatively connected thereto.

Also the flow of water through the rotary joint 72 may be controlled by means of a remotely controlled solenoid valve as hereinbefore described or manually. In all other respects operation of the hose reeling device of FIG. 5 is similar to that hereinbefore described.

The hose reeling apparatus 95 of FIG. 6 is substantially similar to that described with reference to FIG. 5, with the exception that a speed reduction unit in the nature of a gear train or the like 96 is interposed between the motor means 97 and the reel or spool 98 of the reel means. In this form of the invention one end 98A of the reel is defined as a pulley 99 adapted to receive a driving belt 100 which connects the same to the output 101 of the speed reduction unit 96. The input 102 of the speed reduction unit 96 in turn is connected in driving relationship to the motor spindle by means of a drive belt 103 which is connected into and out of driving relationship by clutch means similar to that described with respect to FIG. 8. Accordingly, the r.p.m. of the reel means is reduced to a very low value. It is contemplated that in this form of the invention the hose 104 may be manually distended to any length desired, and if desired a sprinkling type nozzle may be connected to the end of the hose. Thus when the motor 97 is energized the speed reduction unit 96 reduces the rotation of the reel to such an extent, that with the water flowing through the hose, a lawn may be sprinkled as the reeling operation is being performed. Consequently, the reeling operation will cause the sprinkler to be pulled slowly over the lawn in a path predetermined by the lay of the extended hose thereon.

Accordingly, the reeling and sprinkling may be simultaneously performed, the end result being that the sprinkling operation is terminated at the exact instant that the hose has finally and completely reeled in. In all other respects the construction of FIG. 7 is similar to that described with respect to FIG. 6.

Thus it will be noted that with the invention herein described a heretofore tedious job of manually reeling in and rolling a hose onto its storage spool is completely obviated. Also in one embodiment of the invention, both sprinkling and reeling in of the hose can be simultaneously effected in a relatively simple and expedient manner.

While the instant invention has been described and disclosed with respect to several embodiments thereof, it will be readily appreciated and understood that variations and modifications thereof may be made without departing from the spirit or scope of the invention.

What is claimed is:

1. A sprinkling hose reeling device comprising:
    (a) a frame,
    (b) a main drive shaft, one end of said drive defining a conduit through which water may flow,
    (c) a rotatory joint connected to the conduit end of said shaft, said joint having an inlet adapted to connect to a water supply means, a solenoid actuated valve for controlling the flow of water through said rotary joint, and switch means operatively connected to said solenoid valve to effect the operation thereof,
    (d) a reel journaled on said drive shaft about which a hose is adapted to be wound,
    (e) means connecting said conduit end of said shaft to the inlet of said hose,
    (f) a drive means for effecting the drive of said drive shaft,
    (g) clutch means interposed between said drive means and said shaft for connecting said shaft into and out of driving relationship with said drive means,
    (h) solenoid means for effecting the actuation of said clutch means,
    (i) a driven shaft journaled between the ends of said frame,
    (j) means connecting said driven shaft in driving relationship to said drive shaft,
    (k) a guide means for guiding the convolutions of a hose on said reel during a reeling in operation, (l) means connecting said guide means in driving relationship with said driven shaft whereby said guide means is actuated in synchronization with the turning of said reel to guide the convolutions of said hose transversely of said reel during a reeling in operation, (m) said latter means comprising, (n) a gear journalled on said driven shaft, (o) a complementary gear disposed in driving relationship with said first gear, (p) a drive sprocket connected to said complementary gear, (q) a driven sprocket spaced from said drive sprocket, (r) endless drive threaded over said sprockets, (s) a hose loop through which said hose is threaded, (t) means connecting said hose loop to said endless drive, (u) and means for automatically deactivating said drive means when said hose is fully wound about said reel.

2. A sprinkling hose reeling device comprising:

(a) a frame, (b) a main drive shaft, one end of said drive defining a conduit through which water may flow, (c) a rotary joint connected to the conduit end of said shaft, said joint having an inlet to which a water supply means is connected, (d) a reel journaled on said drive shaft on which a hose is adapted to be wound, (e) means connecting said conduit end of said shaft to the inlet of said hose, (f) a drive means for effecting the drive of said drive shaft, (g) a unidirectional clutch means interposed between said drive means and said shaft for connecting said shaft into and out of driving relationship with said drive means, (h) solenoid means for effecting the remotely controlled actuation of said clutch means, (i) a driven shaft journaled between the ends of said frame, (j) means connecting said driven shaft in driving relationship to said drive shaft, (k) a guide means for guiding the convolutions of a hose on said reel during a reeling in operation, (l) means connecting said guide means in driving relationship with said driven shaft whereby said guide means is actuated in synchronization with the turning of said reel to guide the convolutions of said hose transversely of said reel during a reeling in operation, (m) said latter means including, (n) a gear journalled on said driven shaft, (o) a complementary gear disposed in driving relationship with said first mentioned gear, (p) a driving sprocket connected to said complementary gear, (q) a driven sprocket spaced from said drive sprocket, (r) endless drive threaded over said sprockets, and endless drive transversing the width of said reel, (s) a hose loop through which said hose is threaded, (t) means connecting said hose loop to said endless drive, (u) valve means for controlling the flow of water to said rotary joint, (v) means for remotely controlling the operation of said valve means, and a speed-reducing means interposed between said drive means and said reel, (w) a limit switch actuated by said hose to cease the operation of said hosing reeling device upon the completion of a reeling in operation.

3. The invention as defined in claim 2 and including means for cleaning said hose during a reeling in operation.

4. A sprinkling hose reeling apparatus comprising:

(a) a frame, (b) a main drive shaft, (c) a reel journaled on said shaft, said reel being adapted to having wound thereon a hose, (d) a motor means, (e) a flexible belt connecting said shaft in driving relationship with said motor means, (f) a means for exerting a tension on said belt for connecting said shaft into and out of driving relationship with said shaft, (g) a hose indexing means, (h) means for connecting said hose indexing means in driving relationship to said main shaft, said latter means including a driven shaft, (i) means connecting said driven shaft in driving relationship to said main shaft, (j) a gear mounted on said driven shaft, (k) a complementary gear disposed in meshing relationship with said gear, (l) a crank arm connected to said complementary gear, (m) a bell crank lever mounted on said frame, (n) and a connecting link connecting one leg of said bell crank to said crank arm, (o) and a hose retainer connected to the other leg of said bell crank whereby the engagement of said main shaft in driving relationship with said motor means effects lateraly displacement of said hose retainer transversely across said reel to guide the convolutions of said hose thereon during a reeling in operation, and a rotary joint forming a bearing for one end of said shaft, and means connecting the inlet of said hose to the outlet of said joint.

5. The invention as defined in claim 4 and including a rotary joint forming a bearing for one end of said shaft, and means connecting the inlet of said hose to the outlet of said joint; a hose reeling appartus comprising:

(a) a frame, (b) a reel means including a shaft and a reel journaled thereon, (c) bearing means for rotatably journaling said shaft on said frame, (d) a motor means, (e) drive means connecting said motor means into and out of driving relationship with said reel means, (f) a hose guide means, (g) means connecting said hose guide means into driving relationship with said reel means whereby said hose guide means is actuated to transverse across said reel in synchronization thereto during a reeling in operation.

6. A sprinkling hose reeling apparatus comprising, a frame, a reel means including a shaft and a reel journalled thereon, bearing means for rotatably journalling said shaft on said frame, and motor means, drive means connecting said motor means into and out of driving relationship with said reel means, a hose guide means, means connecting said hose guide means into driving relationship with said reel means whereby said hose guide means is actuated to traverse across said reel in synchronization thereto during a reeling in operation, and said drive means including:

a gear reduction unit having an input shaft connected in driving relationship to said motor means, and an output shaft, means connecting the output of said unit in direct drive relationship to said reel of said reel means, said gear reduction unit reducing the speed of said reel so that said reel is slowly and automatically wound upon said reel whereby a sprinkling and reeling in operation can be simultaneously effected.

7. The invention as defined in claim 6 and including means for controlling the flow of water to said hose.

8. The invention as defined in claim 6 wherein said bearing means includes:
   (a) a rotary joint for directing the flow water to said hose, and
   (b) a remotely controlled valve to control the flow of water to said joint.

9. The invention as defined in claim 8 wherein said rotary joint comprises:
   (a) a stationary bearing member having a water inlet thereto,
   (b) a nipple connected to said water inlet said nipple extending axially of said stationary member,
   (c) a second bearing member rotatably journaled on said nipple,
   (d) said second bearing member having a water outlet connected in communication with said nipple,
   (e) means defining a fluid tight seal between said member,
   (f) and said rotatory member being connected to said said reel shaft to rotate therewith.

References Cited

UNITED STATES PATENTS

| | | | |
|---|---|---|---|
| 936,385 | 10/1909 | Thornburg | 242—158.1 |
| 1,659,788 | 2/1928 | Sifkovitz | 137—355.26 |
| 1,935,585 | 11/1953 | Tornblom | 242—158 |
| 2,275,544 | 3/1942 | Miller et al. | |
| 2,301,208 | 11/1942 | Gear | 137—355.2 X |
| 2,514,862 | 7/1950 | Hannay | 137—355.2 |
| 2,573,868 | 11/1951 | Newell | 137—355.21 |
| 2,595,655 | 5/1952 | Hannay | 137—355.2 X |
| 2,669,483 | 2/1954 | Fletcher | 137—355.21 X |
| 2,941,746 | 6/1960 | Hunt | 242—158 |
| 3,062,065 | 11/1962 | Shaw | 74—242.1 |
| 3,136,170 | 6/1964 | Murray | 74—242.11 |

FOREIGN PATENTS 280,379 11/1914 Germany.
4,606 11/1876 Great Britain.

SAMUEL SCOTT, *Primary Examiner.*